United States Patent Office 3,141,989
Patented July 21, 1964

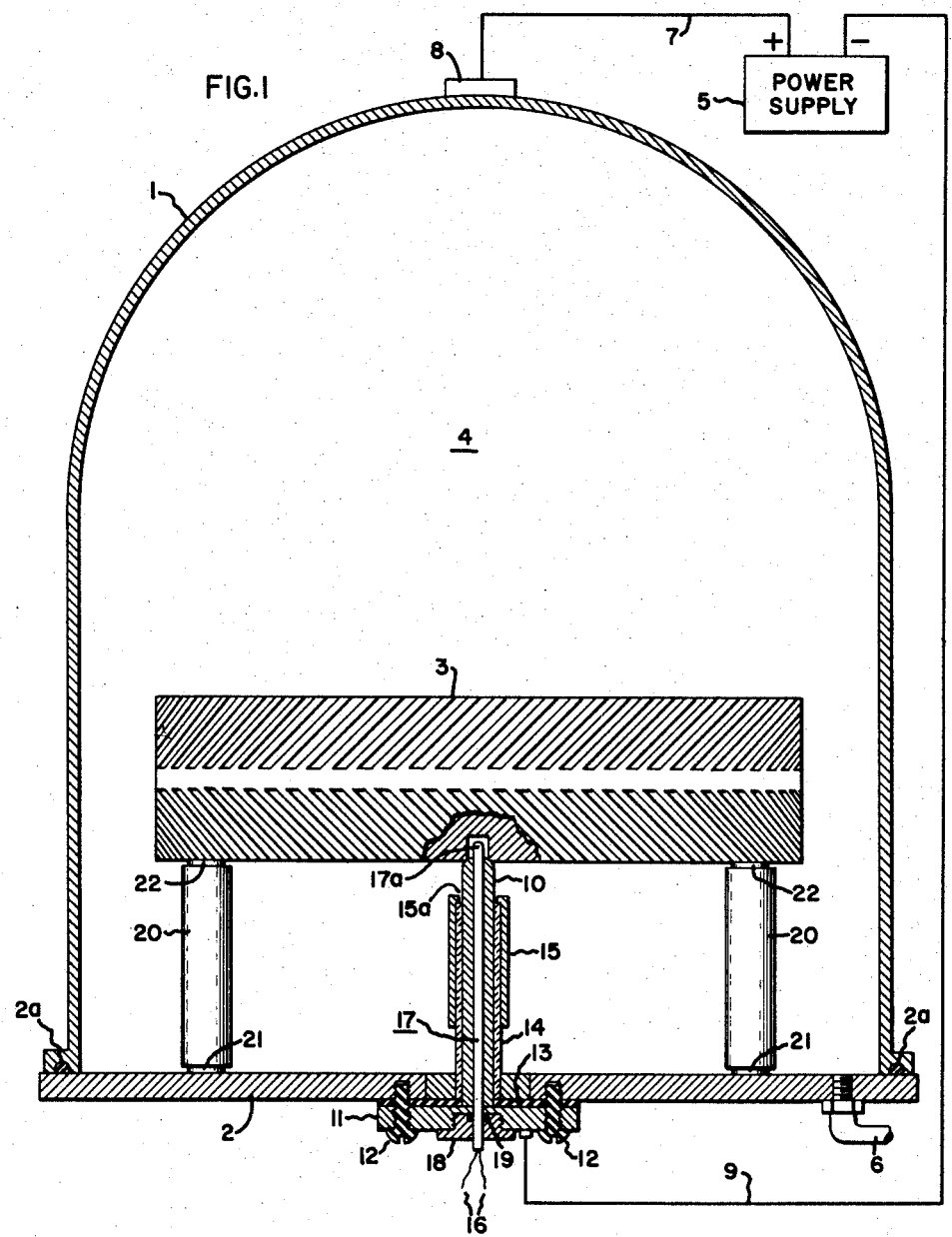

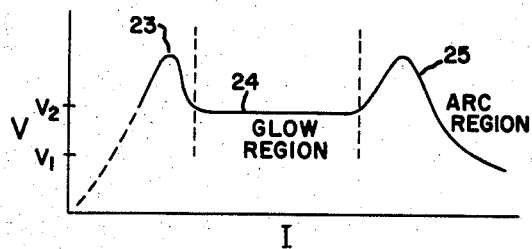
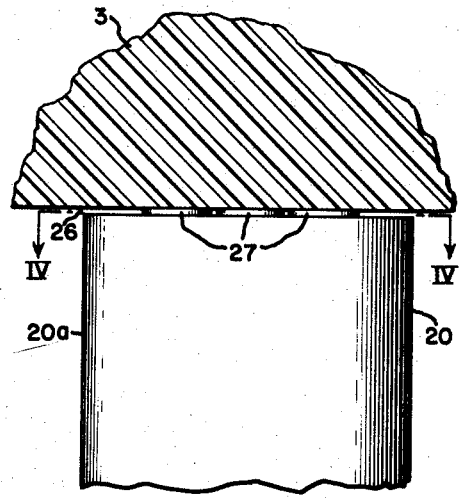
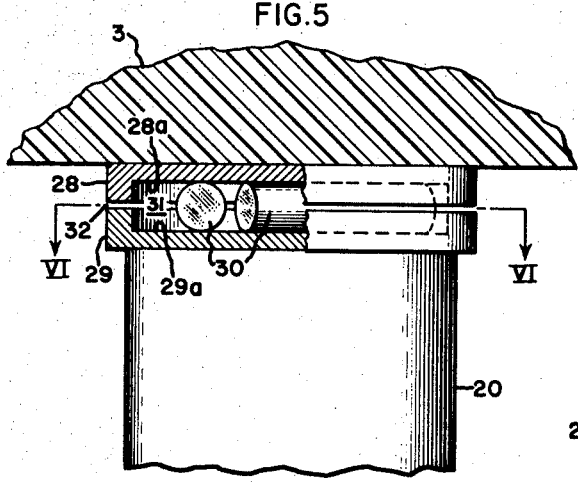
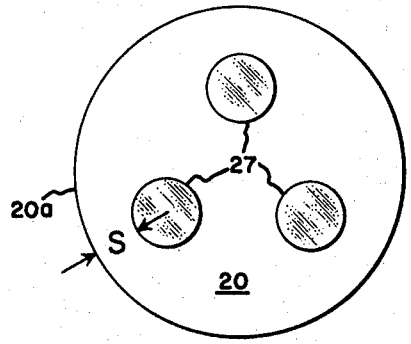
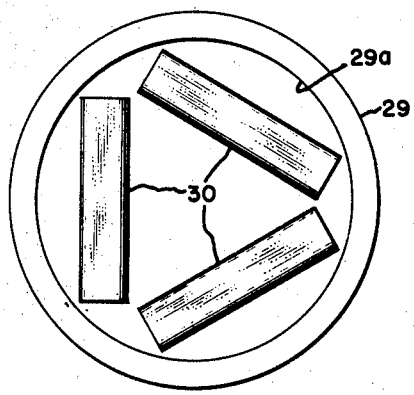
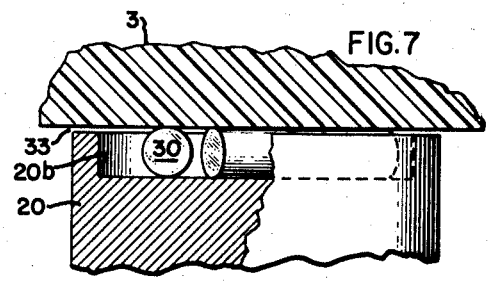

3,141,989
WORKPIECE SUPPORT FOR GLOW DISCHARGE APPARATUS
Claude K. Jones, Marblehead, and Stuart W. Martin, Salem, Mass., assignors to General Electric Company, a corporation of New York
Filed Nov. 26, 1962, Ser. No. 240,000
5 Claims. (Cl. 313—210)

This invention relates to glow discharge apparatus, and more particularly to a support arrangement for heavy work pieces which are to be subjected to a glow discharge process, such as for nitriding.

Various arrangements have been disclosed to subjecting work pieces to a glow discharge in various types of atmospheres to perform functions such as heating, nitriding, denitriding, etc. Such work pieces have generally been supported by an electrode passing through an insulated connection into the low pressure container. In these cases, since the supporting electrode is at the same potential as the work piece, various arrangements have been disclosed for shielding the electrode itself from the action of the glow discharge, since a glow around the electrode performs no useful function and may cause deterioration of the electrode insulation. It is known that suitable spacings between conducting members will prevent the glow discharge from penetrating to the electrode insulator.

With relatively heavy work pieces, such as large gears which are to be nitrided by the glow discharge process, it is no longer feasible to support such work pieces solely by the electrode, since the electrode becomes too large and causes insulating problems. If additional support members are required, they must be insulated from either the base or the workpiece, since these are at different potentials. These supporting members should not, of course, be subjected to a glow discharge since this consumes power which should be used in the transformation of the work piece. Also insulation materials are particularly vulnerable to deterioration under the action of the glow discharge.

Accordingly, one object of the present invention is to provide an improved support arrangement for a heavy work piece subjected to a glow discharge process.

Another object of the invention is to provide an improved support arrangement of the type described, wherein the supporting members are isolated and protected from the glow discharge.

Still another object of the invention is to provide a support arrangement which is insulated from both the work piece and the container by insulating members which are effectively protected from deterioration resulting from the glow.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified elevation view, partly in cross section, of a typical glow discharge apparatus suitable for nitriding gears, FIG. 2 is a graph illustrating the normal voltage-current characteristics of the glow discharge process, FIG. 3 is an enlarged view of one portion of the support arrangement shown in FIG. 1, FIG. 4 is a plan view taken along lines IV—IV of FIG. 3, FIG. 5 is an enlarged elevation view of a modified form of the invention, using a different type of insulating support, FIG. 6 is a plan view taken along VI—VI of FIG. 5, and FIG. 7 is an elevation view, similar to FIG. 5, of another modification of the invention.

Briefly stated, the invention is practiced by supporting the work piece by one or more conductive members which are electrically insulated from both the conductive work piece and the conductive supporting base so as to assume a potential intermediate to that of the work piece and the base. The insulating members separating the conducting members are load-bearing. They are arranged to be surrounded by a protective gap which prevents the glow from entering and destroying the insulating members. The insulating members may also be shaped so as to roll slightly to adjust for differential movements due to thermal expansion of the work piece.

Referring now to FIG. 1 of the drawing, a metal bell-shaped dome 1 is attached to a metal supporting base 2, such as by bolts (not shown) and provided with a gas-tight seal, such as O rings 2a. Dome 1 and base 2 are of electrically conductive material, so as to establish a glow discharge with a work piece, such as a gear 3 disposed inside chamber 4, when a suitably controlled electrical potential is supplied by a power source 5. The current supplied by source 5 may be A.C., but is preferably D.C., with the work piece 3 connected to the negative terminal. A communicating pipe 6 connected to vacuum pumps and sources of gas supply (not shown) serves to allow chamber 4 to be first evacuated and then supplied with a suitable controlled atmosphere for conducting an operation on work piece 3. For example, if gear 3 is to be nitrided, the atmosphere will be essentially nitrogen-containing at a reduced pressure.

An electric potential is supplied between gear 3 and members 1, 2 from power source 5, by means of a lead 7 connected to dome 1 by electrode 8 and, through lead 9, connected to an electrode 10 via a conducting plate 11. Plate 11 is secured to the supporting base 2 by insulating nylon screws 12, and additionally insulated therefrom by an insulating plate 13. A suitable insulating glass cylinder 14 extends over the lower part of electrode 10, preventing it from entering into the glow discharge; a steel sleeve 15 surrounds a portion of tube 14 and is supported thereby. Sleeve 15 thus assumes an intermediate potential between that of base 2 and gear 3, and protects sleeve 14. An annular gap 15a is of such a size as to prevent the glow from entering and deteriorating the top of glass cylinder 14.

The temperature of work piece 3 is monitored by means of thermocouple wires 16 which extend through the steel thermocouple tube 17, inside electrode 10. A plug 18 serves to receive the end of thermocouple tube 17 and to seal it by means of O ring 19.

The insulating support arrangement forming the subject of the present invention comprises one or more support columns 20, which primarily sustain the weight of gear 3. Columns 20 are separated and insulated from both the base 2 and the gear 3 by special load-bearing insulating members 21, 22 to be described in detail.

Referring now to FIG. 2 of the drawing, the characteristic curve of a typical glow discharge may be seen. The current "I" flowing between the housing (usually connected as the anode) and the work piece (usually connected as the cathode) is shown along the horizontal axis, while the electrical potential "V" between the housing and the work piece is shown on the vertical axis. As the gas pressure inside chamber 4 is reduced and the electrical potential is increased, current will begin to flow, approaching a peak indicated as 23, whereupon the current will increase without any further increase in potential into a normal "glow region" designated as 24. Portion 24 has the characteristic that the current can vary considerably without any significant change in voltage. The usual glow discharge process will be controlled so as to take place in region 24. A further increase in applied potential will cause the glow to extend into an abnormal glow region and finally to deteriorate into an arc, indicated by portion 25 of the curve, which is to be avoided.

According to the invention, the work piece is supported by one or more conductive load-bearing members, generally of steel or some such electrically conductive material, which are insulated from both the work piece and the container by electrically insulating load-bearing members, such as illustrated in the enlarged elevation and plan views of FIGS. 3 and 4 respectively. In FIG. 3, the gear 3 and column 20 are separated from one another by an annular gap 26 which may be on the order of $\frac{1}{32}$ to $\frac{3}{32}$ inch. Disposed a substantial distance radially inward from the outer edge 20a of column 20 are a number of spaced flat insulating plates 27, such as glass discs. Other insulating materials having high strength in compression may be used, such as alumina, ceramics, mica, etc. These may be either integral bodies or several thin discs, or rectangular wafers stacked to provide the proper spacing 26.

It is to be noted that an equivalent arrangement as pictured in FIGS. 3 and 4 would also be used at the bottom of column 20, with the exception that plates 27 would lie between the column and the supporting base 2 (i.e., located at 21 in FIG. 1).

Reference to the plan view of FIG. 4 shows that there may be several such plates 27 spaced a substantial distance S inward from the periphery 20a of conductive column 20. The gap 26 (FIG. 3) extending over the minimum distance S provides a protective gap surrounding the load-bearing insulators 27. The narrow dimension of gap 26 prevents the glow which envelops gear 3 from entering the gap and causing deterioration of the insulating members.

While flat discs or plates 27 such as shown in FIGS. 3 and 4 are capable of supporting fairly large members, fracture may occur when the work piece becomes extremely heavy or due to movement caused by differential thermal expansion. To this end, a modified form of the invention is disclosed in FIGS. 5 and 6. Here, conductive metal discs 28, 29 contact the gear 3 and column 20 respectively. Recesses 28a, 29a are cut in discs 28, 29 respectively to form a chamber 31. A number of glass rods 30 are placed inside chamber 31, serving to insulate disc 28 from disc 29 and to support the load with less chance of fracture than the flat glass insulating discs 27 of the preceding construction. This is because the round rods can roll slightly to compensate for thermal expansion. The depths of recesses 28a, 29a are selected with regard to the diameters of glass rods 30 so that discs 28, 29 are separated by a selected annular spacing 32, extending completely around the insulator. Spacing 32 is on the order of $\frac{1}{16}''$ or less and, as before, forms a protective gap through which the glow surrounding gear 3 cannot penetrate to attack glass cylinders 30.

Reference to FIG. 6, which is a plan view of the lower disc 29, shows that three such glass rods 30 may suitably be employed inside recess 29a, to provide a stable support for the upper disc 28. In this manner, it is assured that spacing 32 will be maintained constant around the full periphery of the discs.

As with the previous modification, a similar pair of discs with enclosed glass rods would be employed at the bottom of column 20.

FIG. 7 illustrates another modification of the invention which is a variation of the arrangement shown in FIGS. 5 and 6. Instead of employing separate discs to hold the glass rods, the work piece 3 is spaced directly from the end of column 20 by means of glass rods 30. These are disposed in a recess 20b cut directly in the end of conductive column 20. The diameter of rods 30 is slightly greater than the depth of recess 20b so as to hold gear 3 spaced from the end of column 20 by a protective gap 33. A plan view of FIG. 7 would appear similar to the plan view of FIG. 6, except that the end of column 20 rather than disc 29 would be seen.

For some applications, it will be apparent that spherical glass or ceramic balls could be substituted for the glass rods 30, either in the FIG. 5 or the FIG. 7 arrangement. These would have the advantage that greater freedom of transverse movement would be given to the gear 3 to expand or contract without stressing the insulators, although the load-bearing capacity would be less.

The operation of the invention is as follows: Since the support columns 20 are conductive and electrically insulated from both the work piece 3 and the base 2, they assume an electrical potential which lies intermediate of the electrical potentials of the work piece and the base. In practice, it has been found that the potential assumed by column 20 will lie substantially half-way between that of the gear and the base.

Referring to FIG. 2 of the drawing, it will be observed that the gear is normally held at a potential $V_2$ (with respect to the potential of the base as a reference) while the gear is undergoing a normal glow discharge (portion 24 of the graph). The columns 20, therefore, will assume a potential $V_1$ (with respect to the base) which is substantially half that of magnitude $V_2$. Since the potential difference between column and gear or between column and base is insufficient to establish a glow, there is no possibility of the columns becoming enveloped in a power-consuming glow discharge.

The insulating members 27 and 30 of FIGS. 3, 5 and 7 are arranged in such a manner as to carry the weight of the work piece both at the top and bottom of columns 20. Normally, the materials used for such insulators would be subject to deterioration by the glow discharge. However, it will be recalled that as shown in FIG. 4, the insulators 27 are located a substantial distance inward from the edge of the columns and are surrounded by a protective gap 26 (FIG. 3) into which the glow cannot penetrate. Similarly, insulators 30 are protected by gap 32 in FIG. 5 or gap 33 in FIG. 7. Hence, the arrangement shown provides protected load-bearing insulators which electrically isolate the column from both the work piece and the base. The modification of FIGS. 5, 6 and 7 using relatively movable insulating members to compensate for thermal expansion, is particularly successful with massive work pieces.

The improved supporting arrangement shown operates satisfactorily to support very heavy objects, such as gears, which could not be supported from the electrodes 10 (FIG. 1). Hence, the structure of the electrode can be kept small and can be made hollow to protect the thermocouple tube 17 from the glow discharge also.

Although the invention has been described with relation to the nitriding of gears, it will be apparent that the insulating support arrangement could be employed in any type of glow discharge apparatus for any type of process where the work piece is too large to be conveniently supported by the electrode.

Modifications other than those disclosed will become apparent to those skilled in the art, and it is intended to cover in the appended claims all such modifications as fall within the true spirit and scope of this invention.

What is claimed as new and desired to secure by Letters Patent of the United States is:

1. In a glow discharge apparatus having a housing including a base member to be maintained at a first electrical potential and adapted to contain a heavy work piece to be maintained therein at a second electrical potential, so as to be subjected to a glow discharge, the combination of:

at least one conductive support column disposed entirely within said housing and extending from said base to said work piece, first and second load-bearing insulating members disposed above and below said column and spacing it from the work piece and base respectively to define first and second protective gaps surrounding the insulating members, the gaps being of a size to prevent the glow from penetrating to the insulating members.

2. In a glow discharge apparatus having a housing including a base member at a first electrical potential, said housing having a heavy work piece disposed therein at a second electrical potential and subjected to a glow discharge, the combination of:
   at least one conductive support column disposed entirely within said housing and extending from said base to said work piece,
   first and second load-bearing insulating members disposed above and below said column and separating it from the work piece and base respectively by substantially uniform first and second clearance gaps surrounding the insulating members, the dimensions of the gaps being such as to prevent the glow from penetrating to said insulating members, whereby each said column assumes an electrical potential between that of the base and work piece.

3. In a glow discharge apparatus having a housing including an electrically conductive base member at a first electrical potential, said housing having a heavy electrically conductive work piece disposed therein at a second potential and subjected to a glow discharge, the combination of:
   at least one electrically conductive support column disposed entirely within said housing and extending from said base to said work piece,
   first and second load-bearing insulating means disposed above and below said column and spacing it from the work piece and base respectively, at least some of said insulating means comprising a plurality of plate members of high strength insulating material disposed inward from the outer edge of the column and separating the column from the adjacent member by a protective clearance gap surrounding said plates, the dimensions of the gap and the spacing from the edge of the column preventing the glow from penetrating to said insulating members.

4. In a glow discharge apparatus having a housing including a base member at a first electrical potential, said housing having a heavy work piece disposed therein at a second potential and subjected to a glow discharge, the combination of:
   at least one conductive support column disposed entirely within said housing and extending from the base to the work piece,
   first and second load-bearing insulating means disposed above and below said column spacing it from the work piece and base respectively, at least one of said insulating means comprising first and second spaced conducting members defining a recess therebetween and a plurality of cylinders of high strength insulating material disposed in said recess and spacing said first and second conductive members apart to define a protective gap surrounding the insulating cylinders, the gap being of a size to prevent the glow from penetrating to the cylinders.

5. In a glow discharge apparatus having a housing including a base member at a first electrical potential, said housing having a heavy work piece disposed therein at a second electrical potential and subjected to a glow discharge, the combination of:
   at least one conductive support column disposed entirely within said housing and extending from the base to the work piece,
   first and second load-bearing insulators disposed above and below said column and separating it from the work piece and base respectively, at least one of said insulators comprising a plurality of round members of high strength insulating material disposed in a recess defined in the end of said column, the diameters of said insulating members being slightly greater than the depth of said recess, whereby the insulating members are surrounded by a gap protecting them from the glow discharge, while they are free to roll to adjust for movement of the work piece relative to the base.

References Cited in the file of this patent
UNITED STATES PATENTS

| | | |
|---|---|---|
| 1,388,373 | Ritchtmeyer | Aug. 23, 1921 |
| 2,219,614 | Berghaus et al. | Oct. 29, 1940 |
| 2,456,795 | Samuelson | Dec. 21, 1948 |
| 2,782,337 | Robinson | Feb. 19, 1957 |